F. S. SHIELDS.
METHOD OF MAKING HOBS.
APPLICATION FILED JULY 26, 1909. RENEWED JAN. 8, 1917.
1,239,047.
Patented Sept. 4, 1917.
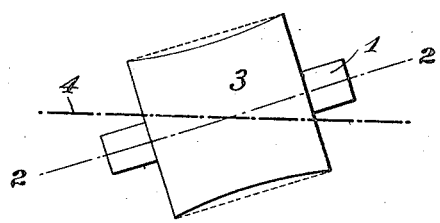
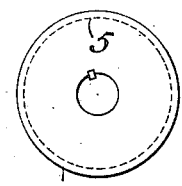
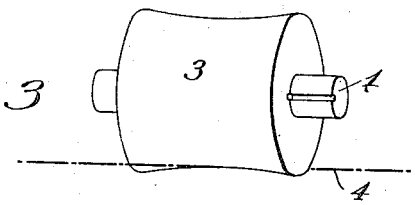
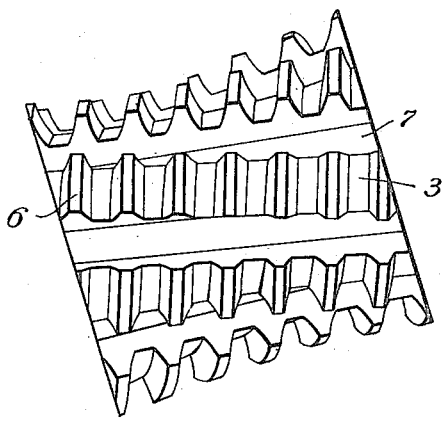
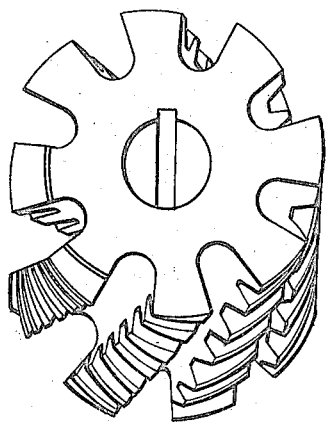
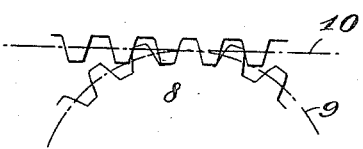

UNITED STATES PATENT OFFICE.

FRANK S. SHIELDS, OF CLEVELAND, OHIO.

METHOD OF MAKING HOBS.

1,239,047.  Specification of Letters Patent.  Patented Sept. 4, 1917.

Application filed July 26, 1909, Serial No. 509,602. Renewed January 8, 1917. Serial No. 141,350.

*To all whom it may concern:*

Be it known that I, FRANK S. SHIELDS, a subject of the Sultan of Turkey, residing at Cleveland, in the county of Cuyahoga and State of Ohio, have invented a certain new and useful Improvement in Methods of Making Hobs, of which the following is a full, clear, and exact description, reference being had to the accompanying drawings.

This invention relates to gear cutters of the type known to the trade as "hobs." These cutters are elongated bodies which are generally cylindrical in shape, having a continuous cutter formed thereon in the shape of a helix extending around the cylindrical surface. In practice, the cutting thread thus produced is provided with recesses extending transversely of the thread and longitudinally of the cylindrical hob body, to provide clearance for chips. In operation, in cutting a spur gear, a cutter of this type is mounted upon a shaft or mandrel which is arranged at such an angle with respect to the plane of the gear blank which is to be cut as will bring the cutting thread of the hob substantially perpendicular to the plane of the gear blank, and this shaft is rotated. The operation of the hob is to simultaneously cut teeth and feed the gear blank around its axis, producing a continuous cutting operation. While some gears produced by hobs of this type are satisfactory, yet all such gears are inaccurate for the reason that, owing to the inclination of the hob, the line of the hob which engages the gear blank is a convex line and the cutters near the ends of the hob do not engage the gear blank properly, producing inaccuracies both in the pitch of the gear and the profile of the teeth, and these inaccuracies are greatly increased in forming gears having a small number of teeth.

In operating upon gear blanks, cutters of the rack type have been employed, the axes of said cutters being parallel to the plane of the gear blank. This insures a straight line contact between the cutter and the gear blank, the line of contact or pitch line of the rack being tangential to the pitch-line of the gear. These cutters, however, are slow in operation as compared with the hobs, since they do not automatically rotate or feed the gear blank during the cutting operation. It is the purpose of my invention to so construct hobs as to secure a straight-line contact, tangential to the pitch-line of the gear to be cut, between a hob and its gear blank, irrespective of the length of the hob whereby the accurate cutting of a rack is secured with the speed of a hob and whereby the hob operates with the same degree of accuracy in producing gears of varying size, provided only that the gears have the same pitch. I attain this object by the means illustrated in the drawings forming part hereof, wherein Figure 1 illustrates the manner of preparing the hob-blank prior to cutting the thread or helix thereon; Fig. 2 represents an end projection of the blank shown in the preceding figure, the dotted line illustrating the depth of the concavity; Fig. 3 is a plan view of the blank shown in the preceding figures, showing in dotted lines the path of the recessing tool along the hob-blank, said path being parallel to a vertical plane passing through the axis of the hob; Fig. 4 represents a side elevation of a completed hob constructed in accordance with my invention; Fig. 5 a perspective view of the hob shown in the preceding figure, and Fig. 6 a somewhat diagrammatic view showing the manner in which my hob operates upon a gear blank.

In preparing a hob, I take a cylindrical blank and mount the same upon a suitable mandrel 1. This mandrel is supported in a lathe at an angle with respect to the center line 2 of the lathe, said angle being determined by the pitch of the gear to be cut by the hob. The blank is operated upon by a tool which moves parallel to the bed plate and is located at a height above said plate corresponding to the center of the hob blank. This tool is reciprocated lengthwise of the hob and the latter is indexed in the usual manner, with the result that the hob blank is concaved, as shown in full lines at 3, Fig. 1. The shape of the blank before this operation by the tool is indicated in dotted lines in Fig. 1, the path of the planer tool being indicated by the broken line 4. By this operation, the cylindrical surface of the blank is recessed or concaved, as will appear by the dotted line 5 in Fig. 2, the depth of such concavity varying with the angle at which the mandrel 1 is tilted with respect to the tool or the lathe bed.

In Fig. 3, I have shown diagrammatically the action of the tool in forming the concaved hob blank 3. The path of the tool shown by the line 4, is a straight line and this straight line touches the surface of the concaved blank throughout its length.

In Figs. 4 and 5, there is shown the completed hob. After the blank has been prepared in the manner described and shown in Figs. 1, 2 and 3, it is provided with a multiple helix 6, the convolutions of which are substantially perpendicular to the plane of the path described by the tool, which will be the plane at which the gear blank will be supported with respect to the hob. The helix is provided with recesses 7 extending longitudinally thereof at right angles to the convolutions of the helix and along lines coincident with the direction of travel of the tool, said recesses being formed between planes defined by radii drawn from the center of the hob. These recesses provide clearance for chips, etc.

The concavity of the hob depends upon and is inversely proportional to the pitch or lead of the gear which is to be cut by the hob; the larger the pitch of the gear, the greater will be the concavity of the hob.

In Fig. 6 I have shown diagrammatically the action of my hob upon a gear blank, this view showing the cutting or pitch line of the hob, which line is always a straight line tangential to the pitch line or circumference of the gear. In this view 8 denotes the gear blank, 9 its pitch line and 10 the cutting or pitch line of the hob 3.

It will be obvious that, in constructing hobs in the manner described hereinbefore, the obliquity of the angle provided between the axis of the blank and the direction of movement of the teeth cutting tool will be inversely proportional to the pitch or lead of the hob, and of the gear cut thereby, as well as inversely proportional to the diameter of the hob.

Having thus described my invention, what I claim is:

1. The method of making a hob which includes supporting a substantially cylindrical blank, rotating said blank about its longitudinal axis, moving a cutting tool in contact with said blank in a straight line at an angle to the said axis and in a plane parallel to a plane containing such axis, and then providing the body thus produced with helically disposed teeth.

2. The method of making a hob which includes supporting a cylindrical blank and a cutting tool in engagement with each other, causing a relative rotary movement between the blank and the tool about the axis of the blank, producing a straight-line contact between the tool and the blank, such line of contact extending at an angle to the axis of the blank and parallel to a plane including such axis, and then providing the body thus produced with helically disposed teeth.

3. The method of making a hob which includes supporting a cylindrical blank and a cutting tool in engagement with each other, causing a relative rotary movement between the blank and the tool about the axis of the blank, producing a straight-line contact between the tool and the blank, such line of contact extending at an angle to the axis of the blank and parallel to a plane including such axis, providing the body thus produced with a helix, and forming teeth by cutting such helix at an angle, said angle being inversely proportional to the pitch or lead of the gear and to the diameter of the hob.

In testimony whereof, I hereunto affix my signature in the presence of two witnesses.

FRANK S. SHIELDS.

Witnesses:
J. B. HULL,
S. E. FOUTS.

Copies of this patent may be obtained for five cents each, by addressing the "Commissioner of Patents, Washington, D. C."